(12) United States Patent
Regenbrecht

(10) Patent No.: US 10,197,045 B2
(45) Date of Patent: Feb. 5, 2019

(54) REDUCING SPRING LOAD PRIOR TO MAINTENANCE ON AN ACTUATOR

(71) Applicant: Natural Gas Solutions North America, LLC, Houston, TX (US)

(72) Inventor: Kurt Douglas Regenbrecht, Hallettsville, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 99 days.

(21) Appl. No.: 15/361,427

(22) Filed: Nov. 27, 2016

(65) Prior Publication Data
US 2018/0149140 A1    May 31, 2018

(51) Int. Cl.
*F03G 1/06* (2006.01)

(52) U.S. Cl.
CPC ............ *F03G 1/06* (2013.01); *F03G 2730/01* (2013.01); *F03G 2730/07* (2013.01)

(58) Field of Classification Search
CPC ..... F03G 1/08; F03G 1/00; F03G 1/06; F03G 2730/07; F03G 2730/01; F16F 1/10; F16F 1/121; F16F 1/122; F16F 1/123
See application file for complete search history.

(56) References Cited

U.S. PATENT DOCUMENTS

| | | | | |
|---|---|---|---|---|
| 456,833 A * | 7/1891 | Morse | ....................... | F03G 1/00 185/45 |
| 2,804,173 A * | 8/1957 | De Millar | ................ | F02N 5/02 123/185.14 |
| 2,833,027 A * | 5/1958 | Foster | ...................... | G04B 1/22 185/37 |
| 3,994,368 A * | 11/1976 | Langwell | .................. | F03G 1/00 185/11 |
| 4,333,391 A * | 6/1982 | Nash | .................... | F15B 15/1476 267/177 |
| 2013/0004358 A1 * | 1/2013 | Underwood, Jr. | ........ | F16F 1/10 418/270 |

FOREIGN PATENT DOCUMENTS

CH    92495 A  *  1/1922  ............... F03G 1/08

* cited by examiner

*Primary Examiner* — Marina Tietjen
(74) *Attorney, Agent, or Firm* — Paul Frank + Collins P.C.

(57) ABSTRACT

A safety device that is useful to release load on a spring found in an actuator. In one embodiment, the actuator can have a housing comprising a pair of housing members and a fastening device coupling the pair of housing members to one another. The embodiment can also have an output shaft extending longitudinally in the housing, the output shaft having an end configured to couple with a process device. The embodiment may also have a spring coupled with the output shaft. The embodiment can further have a safety device coupled to the spring and configured to operate to reduce loading of the spring from a first load to a second load. In one example, the safety device is in position to prevent access to the fastening device at the first load and to allow access to the fastening device at the second load so that the pair of housing members can separate to allow access to the spring in the housing.

16 Claims, 18 Drawing Sheets

REDUCING SPRING LOAD PRIOR TO MAINTENANCE ON AN ACTUATOR

BACKGROUND

Engineers expend great efforts to make devices easy to assemble, reliable to operate, and amenable to maintenance and repair tasks. These efforts may result in features on the device that can foreclose the need to rely on experience or diligence of individuals that perform these tasks.

SUMMARY

The subject matter of this disclosure relates to automation of process devices. Of particular interest below are improvements to actuators that implement safety measures operative during tasks to repair or maintain the device. These safety measures may prevent access to parts of the actuator in order to ensure that the device is in a safe condition for an end user (e.g., a technician) to undertake these tasks.

Some embodiments automate equipment found in commercial, industrial, marine, and power industries. This equipment may include rotary equipment like valves and dampers. In one implementation, the embodiment may include a spring-return mechanism to actuate an output shaft. This mechanism applies a load to the output shaft to shutoff or shutdown the process device in an emergency.

Use of the safety measures herein can prevent access to the spring-return mechanism by the technician under this load. This feature allows the technician to safely address problems on the device. Moreover, the safety measures forego the need for the technician to adhere to any strict protocol or procedure for purposes of placing the device in the safe condition.

BRIEF DESCRIPTION OF THE DRAWINGS

Reference is now made briefly to the accompanying drawings, in which.

Figure 1:
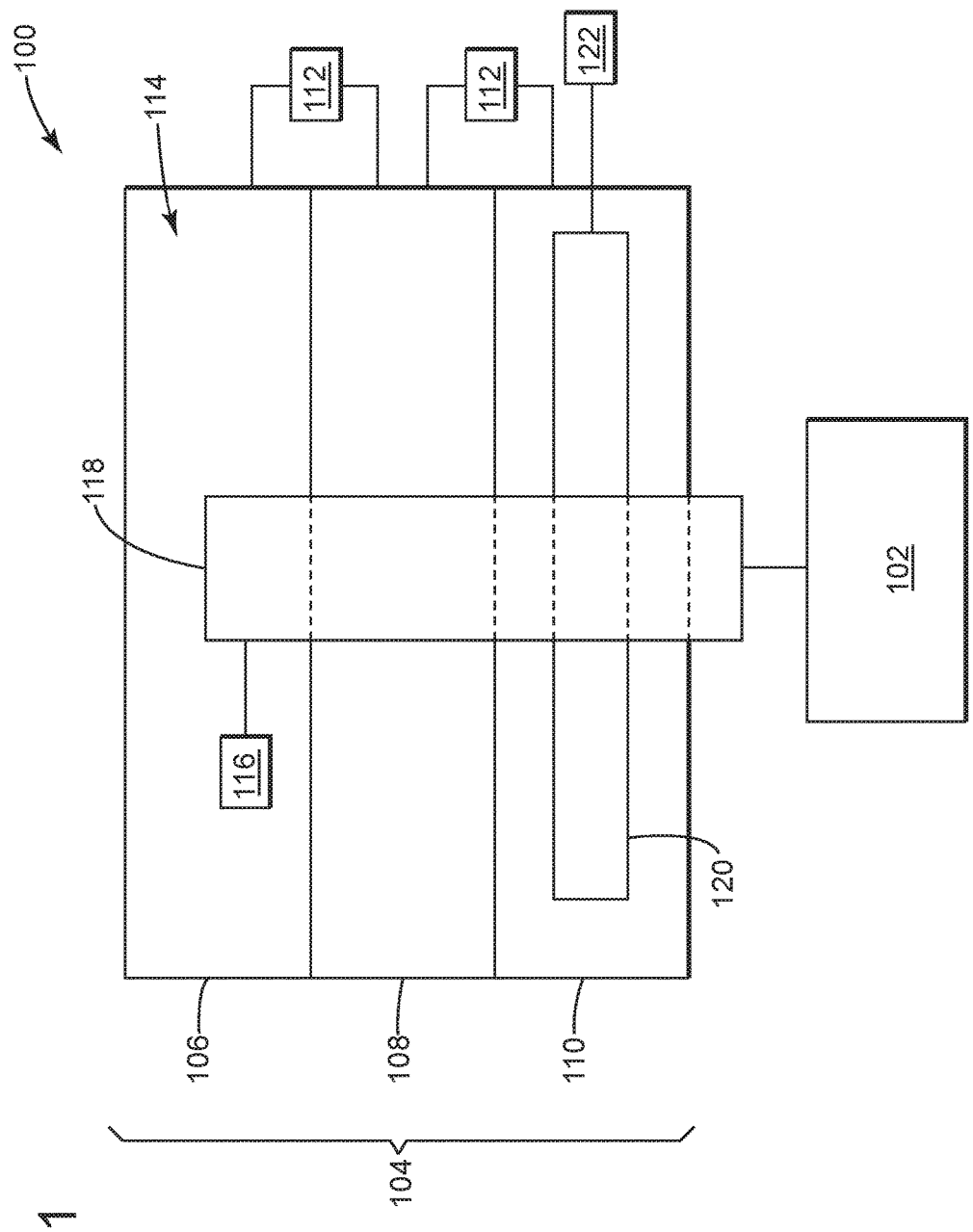
FIG. 1 depicts a schematic diagram of an exemplary embodiment of an actuator.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes various embodiments of an actuator. These embodiments may include a spring-return mechanism that is useful to shutoff or shutdown a process device. The embodiments also incorporate a safety device that can prevent access to the spring-return mechanism under load. Other embodiments are within the scope of the subject matter.

FIG. 1 depicts a schematic diagram of an exemplary embodiment of an actuator 100. This embodiment may be useful to operate a process device, shown generally and enumerated by the numeral 102. The actuator 100 can have a housing 104 with one or more housing members (e.g., a first housing member 106, a second housing member 108, and a third housing member 110). The housing members 106, 108, 110 can couple with one another by way of a fastening device 112 to form an interior cavity 114. Various operating components may reside in the interior cavity 114. These operating components may include an actuating assembly 116 that drives an output shaft 118 to operate the process device 102. Electric motors and brakes may be useful for this purpose, but the actuating assembly 116 may also use pneumatic or hydraulic cylinders to provide motive action to the output shaft 118. The operating components may also include a loading member 120 to provide a load on the output shaft 118. This load can cause the output shaft 118 to configure the process device 102 in a safe condition, for example, in response to loss of power or other operating difficulties with the actuating assembly 116. In one implementation, the actuator 100 may include a safety device 122 that engages with the loading member 120 to maintain the load.

Broadly, the safety device 122 is configured to improve service and maintenance on the actuator 100. These configurations may impair access to the interior cavity 114 so long as the loading member 120 remains under the load. This feature may ensure that the load discharges before an end user (e.g., a technician) comes into contact with the loading member 120. In one implementation, the safety device 122 resides on the housing 104 in a position proximate the fastening member 112. This position may frustrate operation of the fastening member 112 by the technician to release the housing members 108, 110 from one another to allow access to the interior cavity 114. For example, the safety device 122 may make the technician unable to couple a tool (e.g., a wrench, screw driver, etc.) with the fastening member 112. In this regard, the fastening device 112 may embody bolts and like threaded fasteners to couple the housing members 106, 108, 110. This disclosure does contemplate other types of devices for the fastening device 112 that could find use in connection with the subject matter herein. In one implementation, the technician can first actuate the safety device 122. The safety device 122 may remove entirely from the housing 104 or, in one example, simply move to a position that no longer obscures access to the fastening device 112. This strategy releases the load on the loading member 120, effectively placing the actuator 100 in a safe condition (with no load or "low" load on the loading member 120). It also allows the technician to manipulate the fastening device 112 so as to remove the third housing member 110 to obtain access the interior cavity 114.

Figure 2:
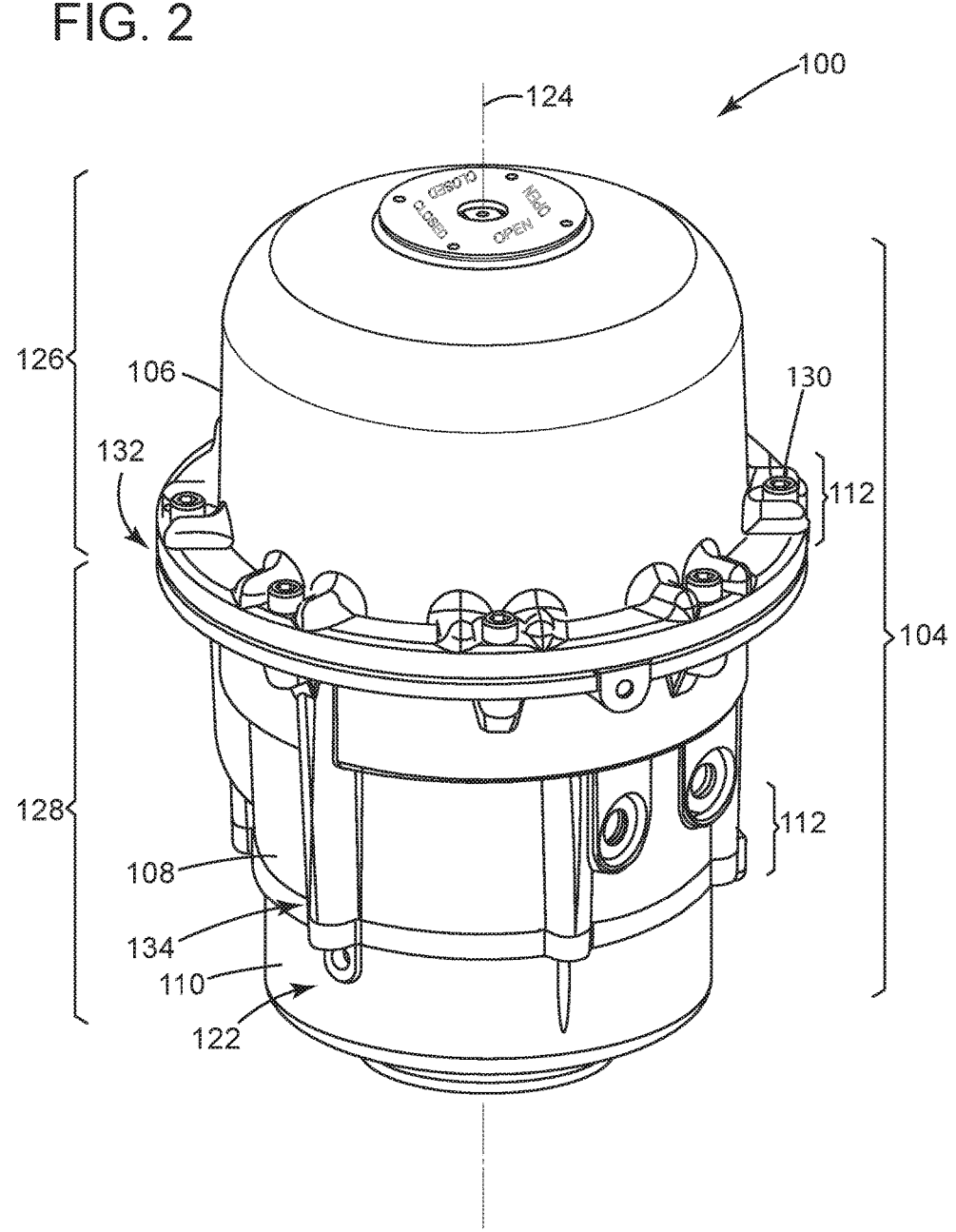
FIG. 2 depicts a perspective view of an example of the actuator of FIG. 1 in assembled form.

FIG. 2 depicts a perspective view of an example of the actuator 100 to illustrate exemplary structure that embodies piece parts and components for the safety device 122. This example may find use in applications to actuate dampers, valve assemblies, and like devices with moveable elements to control flow of material (e.g., solids, liquids, gasses, etc.). The housing 104 can be configured as an enclosure to seal and protect its internal components. This enclosure can have a central axis 124 that extends between an upper part 126 and a lower part 128. The upper part 126 may be formed by the housing members 106, 108 to house the actuating assembly 116. The lower part 128 may be formed by the housing members 108, 110. This part may house the loading member 120. Each of the members 106, 108, 110 can assume a shape that is generally cylindrical, but other shapes may be acceptable for use in certain applications. Construction of the members 106, 108, 110 should be robust so that the enclosure can resist high pressures, high temperatures, corrosion, and similar harsh conditions. The construction may leverage metals (e.g., steels) as cast or machined piece parts that readily assemble together.

The fastening device 112 may include devices that penetrate each of the housing members 106, 108, 110. These devices may comprise fasteners 130 that populate features of the housing members 106, 108, 110. As noted above, bolts and threaded fasteners may be useful for this purpose. These types of fasteners may permit the technician ready access to the interior cavity 114 of the housing 104. In the upper part 126, the fasteners 130 can populate a flange 132 found on each of the housing members 106, 108. In the lower part 128, the housing members 108, 110 may form a plurality of boss elements 134 that can accommodate the fasteners 130 (not shown), preferably inserted in a direction from the third housing member 110 to the second housing member 108 along the central axis 124. The boss elements 134 may be integral with the housing members 108, 110 and disposed in circumferential arrangement around the central axis 124.

The safety device 122 can be located proximate and below at least one of the boss elements 134 in the lower part 128. This position is useful to ensure that loading on the loading member 120 (FIG. 1) reduces to safe levels prior to access by the technician. As noted above, manipulation of the safety device 122 can reduce the load on the loading member 120 (FIG. 1) from a first load to a second load. The safety device 122 may obstruct access to the fastener 130 (not shown) that resides in the boss element 134 at the first load. The technician can, in turn, operate the safety device 122 so that, at the second load, the technician can manipulate the fastener 130 (not shown) to separate the housing members 108, 110.

Figure 3:
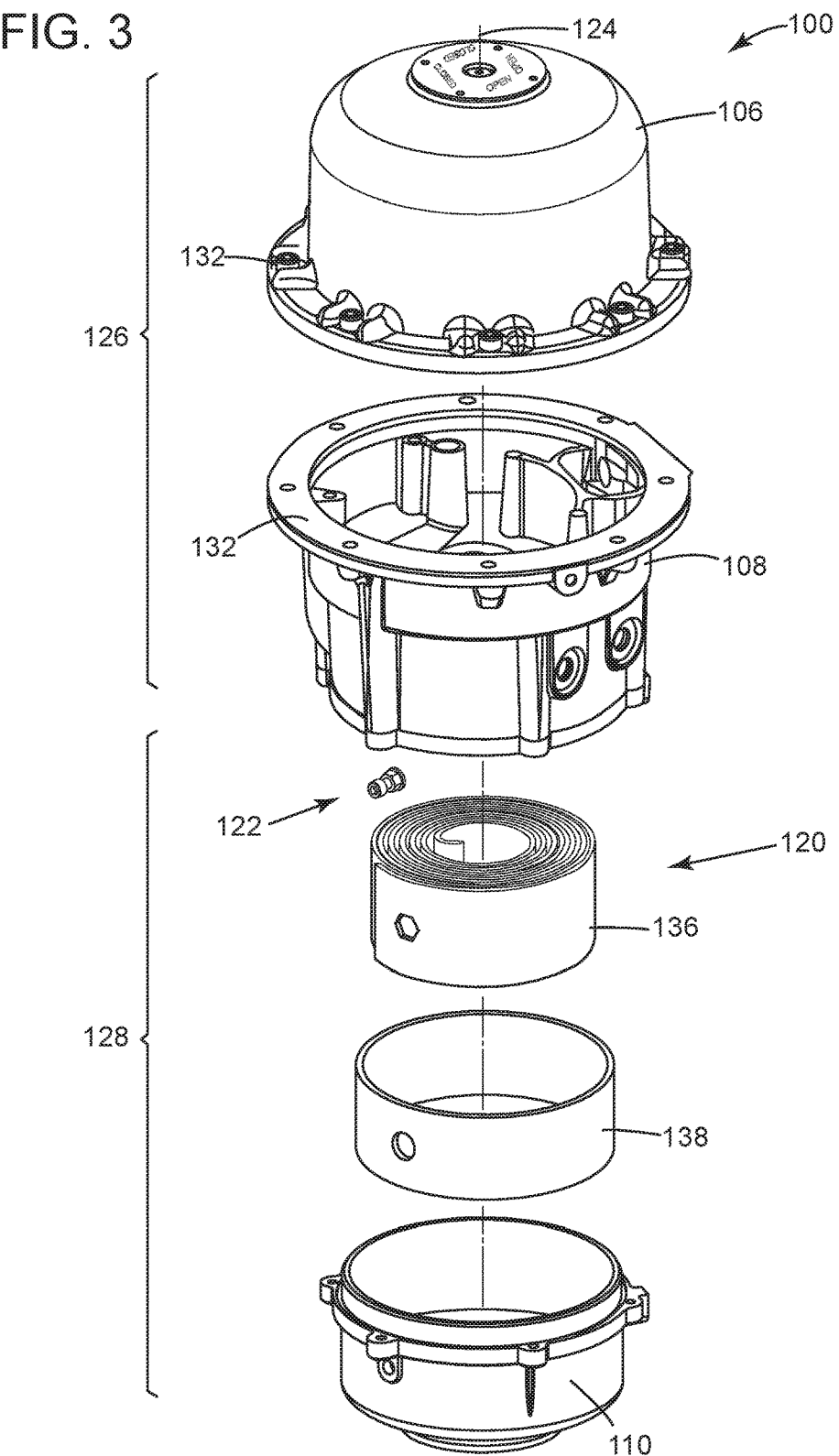
FIG. 3 depicts a perspective view of the actuator of FIG. 2 in exploded form.

FIG. 3 depicts the actuator 100 in exploded form with certain piece parts that, while operative to the device, are not essential to this part of the discussion. These piece parts may include, among others, electronics that control the actuating assembly 116. The loading member 120 may include a spring 136 that circumscribes the central axis 124. The spring 136 may reside in a retaining member 138 (also, "spring keeper 138"). Both the spring 136 and the retaining member 138 may fit into the third housing member 110.

The upper part 126 of the enclosure can house control structure that is useful to operate the actuator 100. The first housing member 106 may have a body that is rounded or bulbous to form the top to the enclosure. An opening at the apex of the body may be useful to allow the output shaft 118 (FIG. 1) or other elements to penetrate through the top. The flange 132 may form a planar or generally planar surface that circumscribes the periphery of the body with openings to accommodate the fasteners 130 (FIG. 2). The flange 132 may form a corresponding flat surface on the second housing member 108. When assembled, the flat surfaces of the members 106, 108 can mate with one another to form a seal that is operative to prevent exposure of the control structure disposed in the enclosure. The seal may include a gasket (e.g., o-ring), as necessary.

Figure 4:
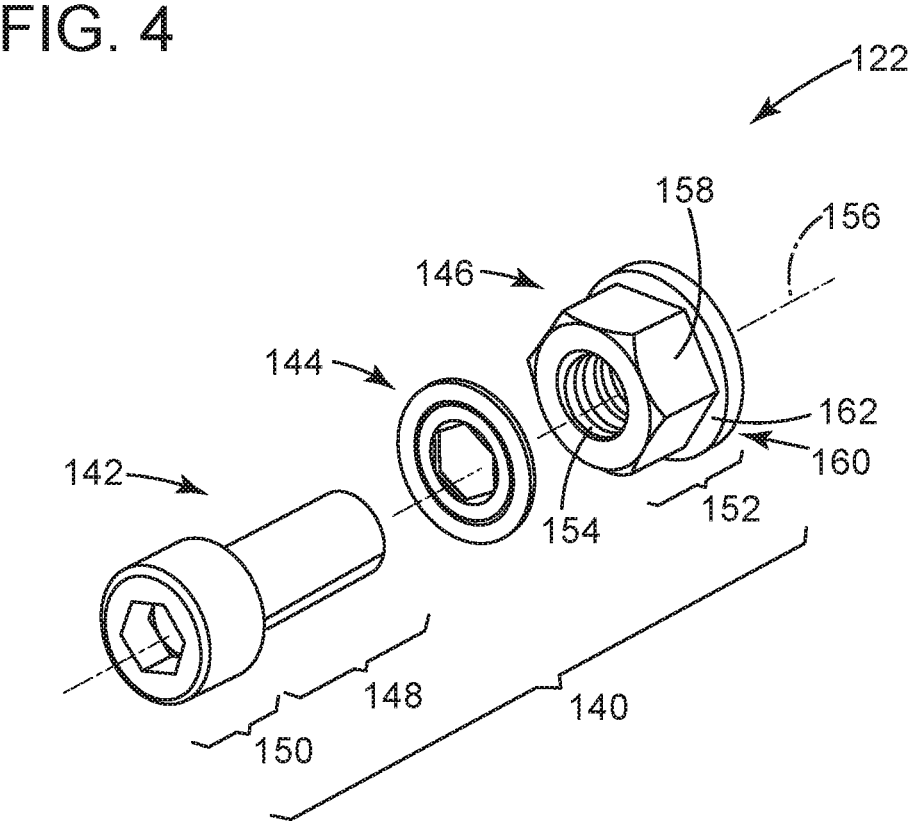
FIG. 4 depicts a detail view of the actuator of FIG. 3 to illustrate details of a configuration for the safety device contemplated herein.

FIG. 4 depicts a detail view of the example of FIG. 3 to focus on one configuration of the safety device 122. This configuration takes the form of a fastener assembly 140 with a fastener 142, a washer 144, and a nut 146. The fastener 142 can have a threaded portion 148 and a head portion 150 configured for engagement by a tool (e.g., screw driver, allen wrench, etc.). The washer 144 can be round with an aperture appropriately sized to accommodate the threaded portion 148 of the fastener 142. Examples of the nut 146 can have a body 152 with a centrally-located bore 154 that forms an axis 156. The bore 154 may incorporate threads that correspond to threads in the threaded portion 148 on the fastener 142. The outside of the body 152 can have a number of flat surfaces 158 (also, "flats 158") disposed circumferentially about the axis 156. At one end, the body 152 may terminate in a flange 160 having an outer dimension that is larger than the radial dimension of the flats 158 so as to form a shoulder 162.

Figure 5:
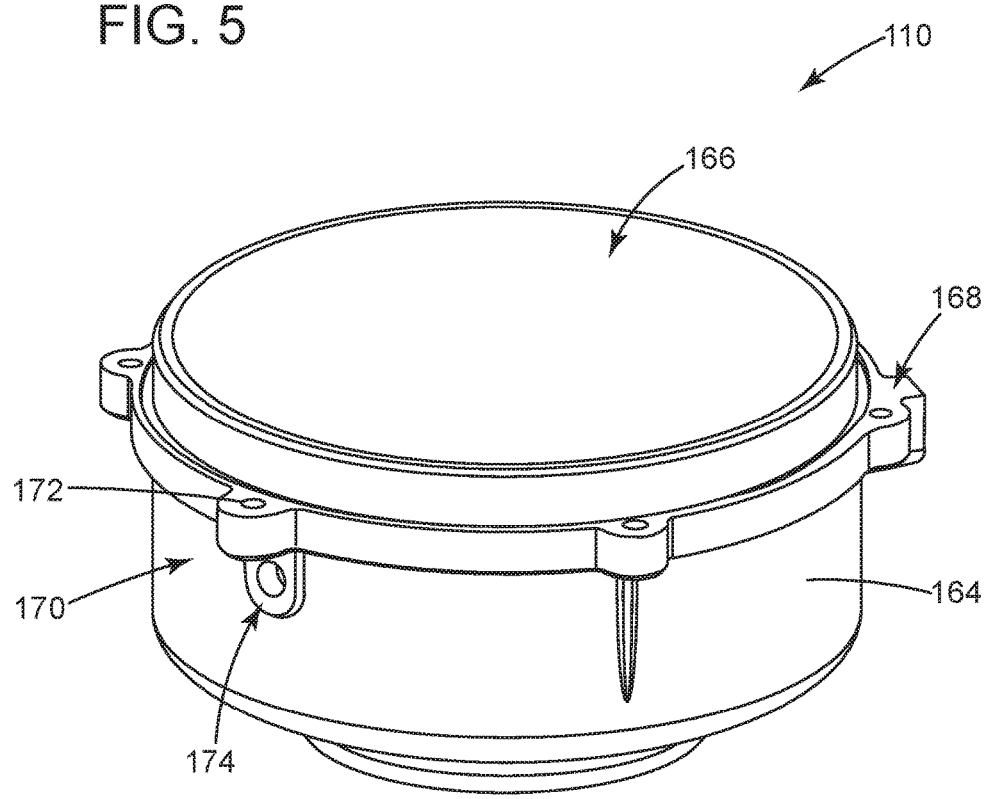
FIG. 5 depicts a detail view of the actuator of FIG. 3 to illustrate details of a configuration for the housing contemplated herein.
Figure 6:
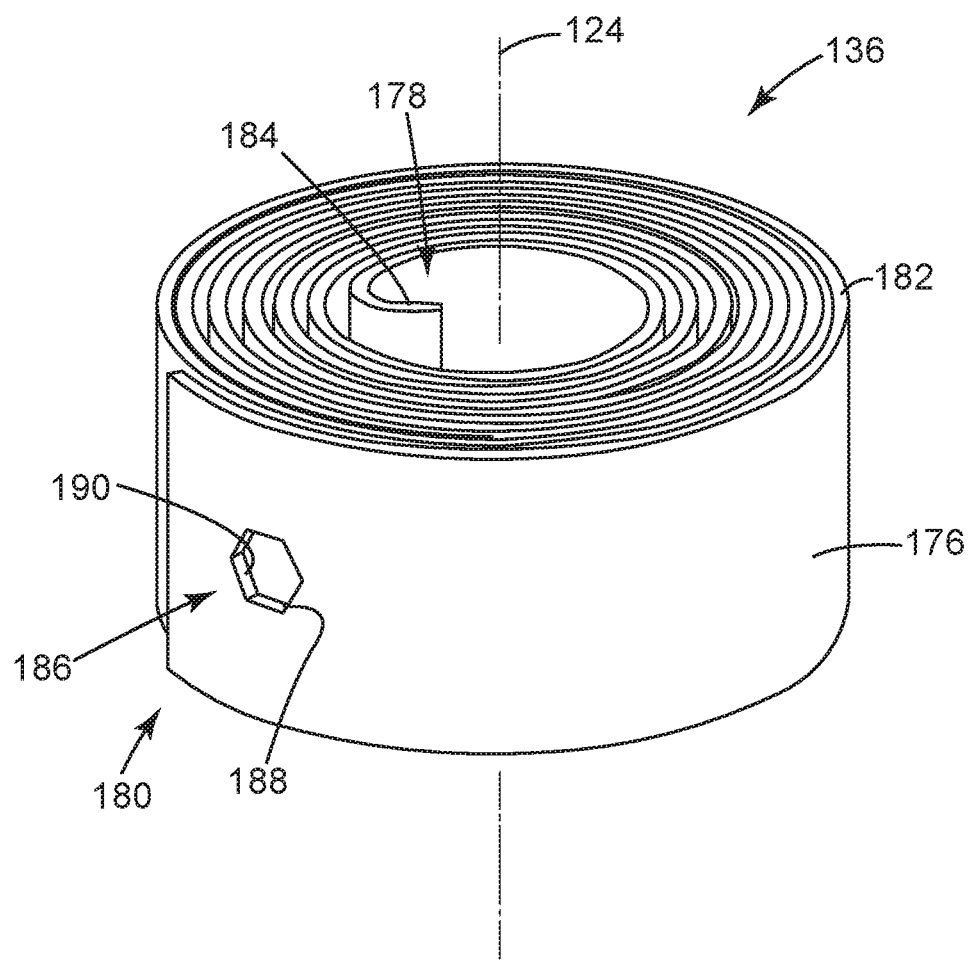
FIG. 6 depicts a detail view of the actuator of FIG. 3 to illustrate details of a configuration for the spring-return mechanism contemplated herein.
Figure 7:
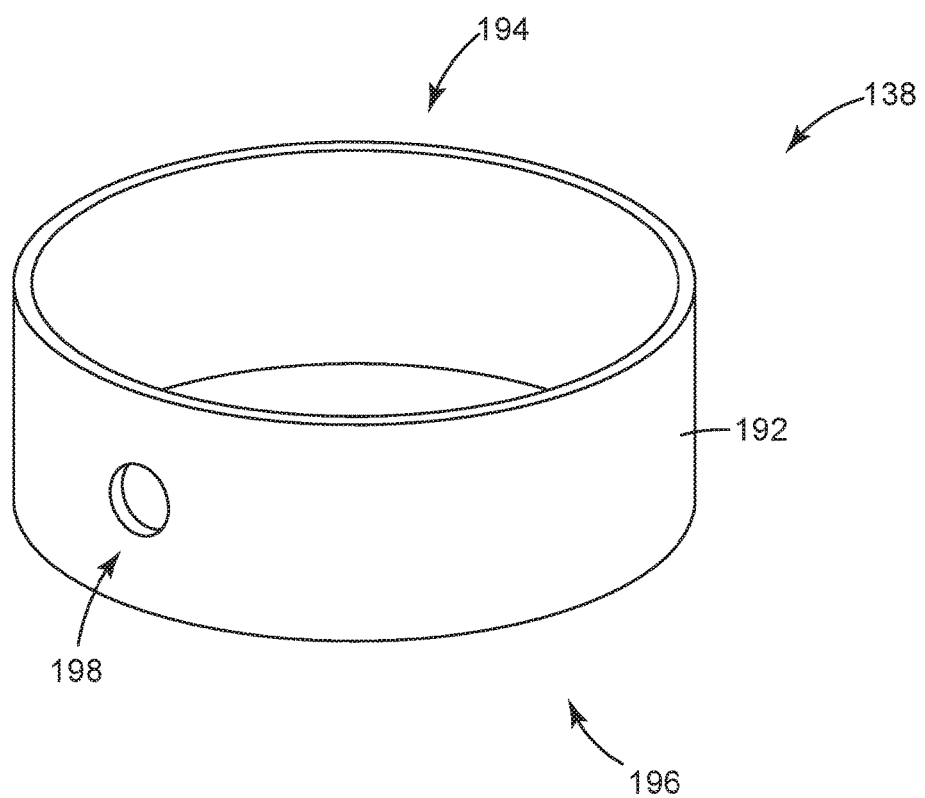
FIG. 7 depicts a detail view of the actuator of FIG. 3 to illustrate details of a configuration for the retaining member contemplated herein.

FIGS. 5, 6, and 7 depict detail views of the example of FIG. 3 to focus on one configuration for each of the third housing member 110, the spring 136, and the retaining member 138, respectively. In FIG. 5, the third housing member 110 can include an outer wall 164 forming the periphery of a cavity 166 that is sized and configured to receive each of the spring 136 (FIG. 3) and the retaining member 138 (FIG. 3). The third housing member 110 may also include a flange 168 with arcuate elements 170 having a rounded peripheral or outer surface. The arcuate elements 170 can be spaced apart from one another about the periphery of the outer wall 164 to position fasteners 130 (not shown) for proper engagement with the second housing member 108 (FIGS. 2 and 3). Each of the arcuate elements 170 can have an opening 172, typically operating as a through hole for fasteners (e.g., fasteners 130) to secure the housing members 108, 110 (FIG. 3). The outer wall 164 can have an aperture 174 disposed below one of the arcuate elements 170. The aperture 174 can penetrate through the outer wall 164 to expose the interior of the cavity 166.

FIG. 6 shows an example of the spring 136. This example has a resilient body 176, preferably comprising thin steel or sheet metal, with a pair of ends (e.g., a first end 178 and a second end 180). The resilient body 174 is wound about the central axis 124 to form a plurality of concentric coils 182. At the first end 178, the resilient body 176 may terminate in a tab portion 184 that resides proximate the central axis 124. The tab portion 184 may be flat and non-concentric as relates to the concentric coils 182. The second end 180 of the resilient body 176 may include an aperture 186 that penetrates through at least one of the concentric coils 182, but this may increase to additional, adjacent concentric coils 182 as necessary. The aperture 186 may have an outer surface 188 with geometry that corresponds with geometry found on the nut 146 (FIG. 4). In one implementation, the geometry may include flat surfaces 190 to match the flats 158 (FIG. 4) on the body 152 (FIG. 4) of the nut 146 (FIG. 4).

FIG. 7 shows an example of the retaining member 138. In this example, the retaining member 138 may have a generally thin, peripheral wall 192 forming a cylinder that is open at each end (e.g., a first open end 194 and a second open end 196). The cylinder can form a sleeve to that bounds the loading member 120 (FIG. 1). An aperture 198 may penetrate through the peripheral wall 192. The aperture 198 may operate to provide clearance for parts of the fastener assembly 140 (FIG. 4) to extend through and engage the loading member 120 (FIG. 1).

Figure 8:
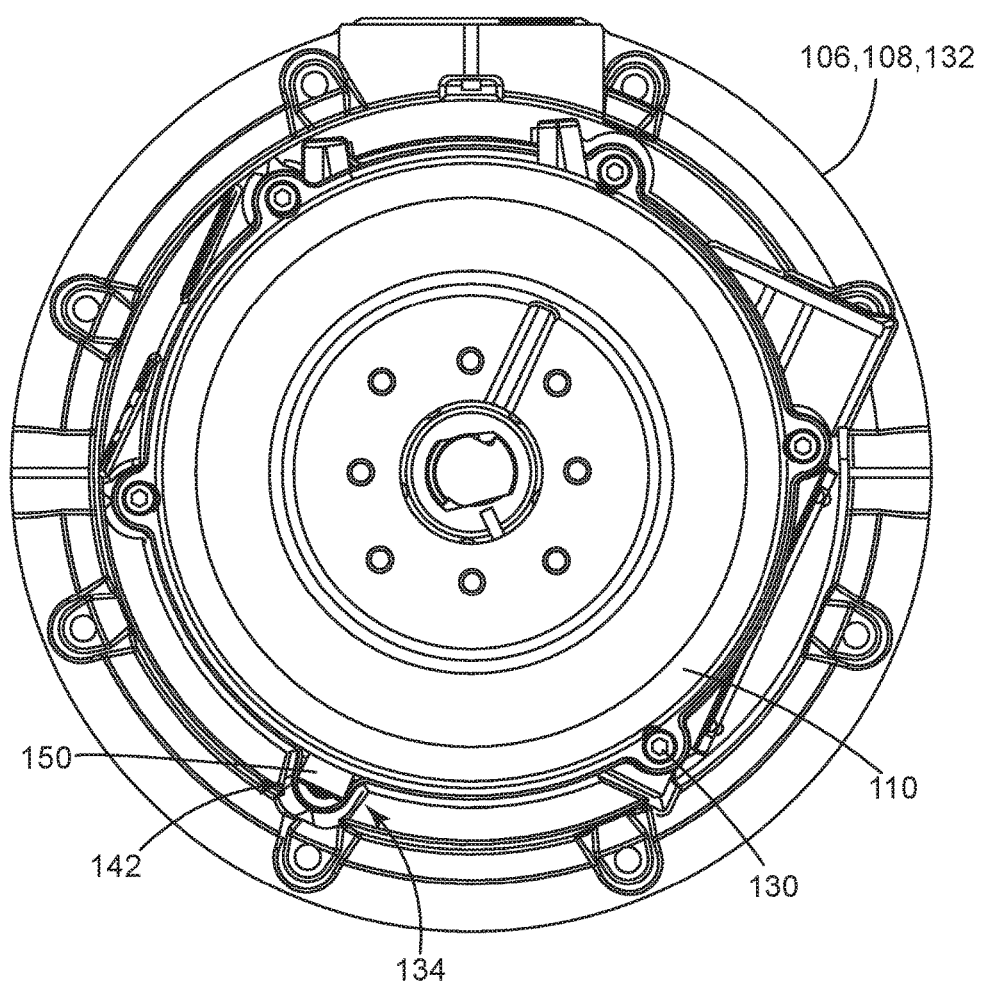
FIG. 8 depicts a plan view of the bottom of the actuator of FIG. 2.
Figure 9:
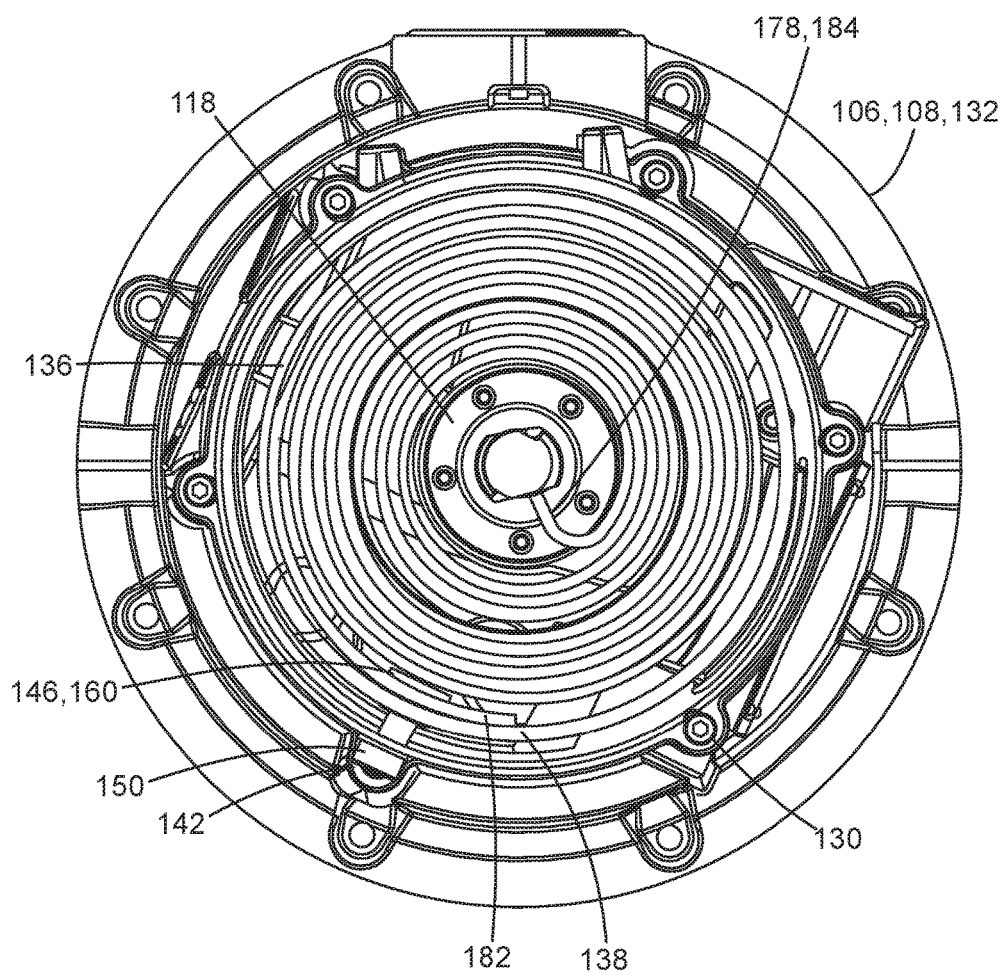
FIG. 9 depicts the actuator of FIG. 8.
Figure 10:
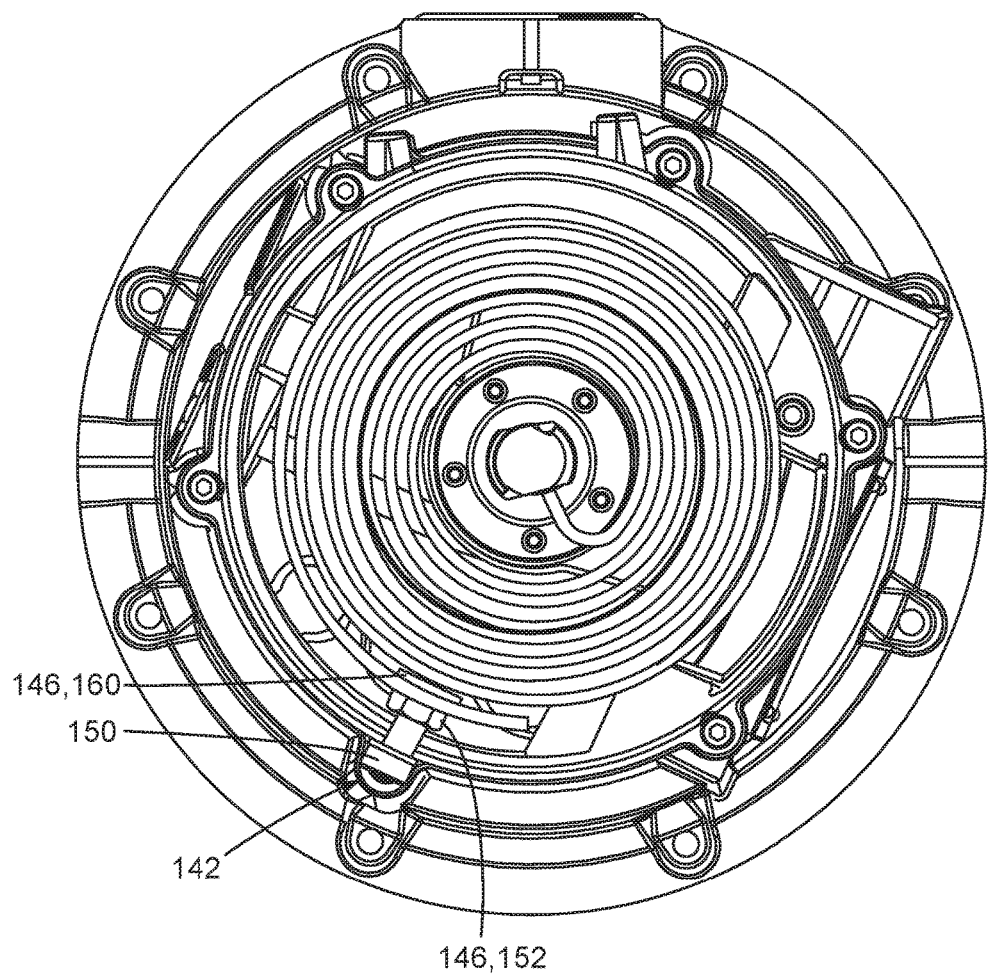
FIG. 10 depicts the actuator of FIG. 8.

FIGS. 8, 9, and 10 depict a bottom view of the example of FIG. 4. With reference first to FIG. 8, fasteners 130 may populate the boss elements 134 to maintain secure connection between the housing members 106, 108. The head portion 150 of the fastener 142 obscures fastener 130 in at least one of the boss elements 134. This feature of the safety device 122 is useful to impair access to the lower part 128 (FIGS. 2 and 3) of the enclosure. FIG. 9 shows the example with the third housing member 108 removed to expose the inside of the interior cavity 114 (FIG. 1). The fastener 142 extends through the retaining member 138 to engage the nut 146. The flange 160 of the nut 146 may contact an inner surface of at least one of the coils 182 (also, the "engagement" coil or coils). At the first end 178, the tab portion 184 extends at least partially into the output shaft 118. This feature causes loading or preload of the spring to rotate the output shaft 118, for example, in response to power loss at the actuating assembly 116 (FIG. 1). As best shown in FIG. 10, which illustrates the example with the retaining member 138 removed from the assembly, the body 152 of the nut 146 can extend through the engagement coil.

Figure 11:
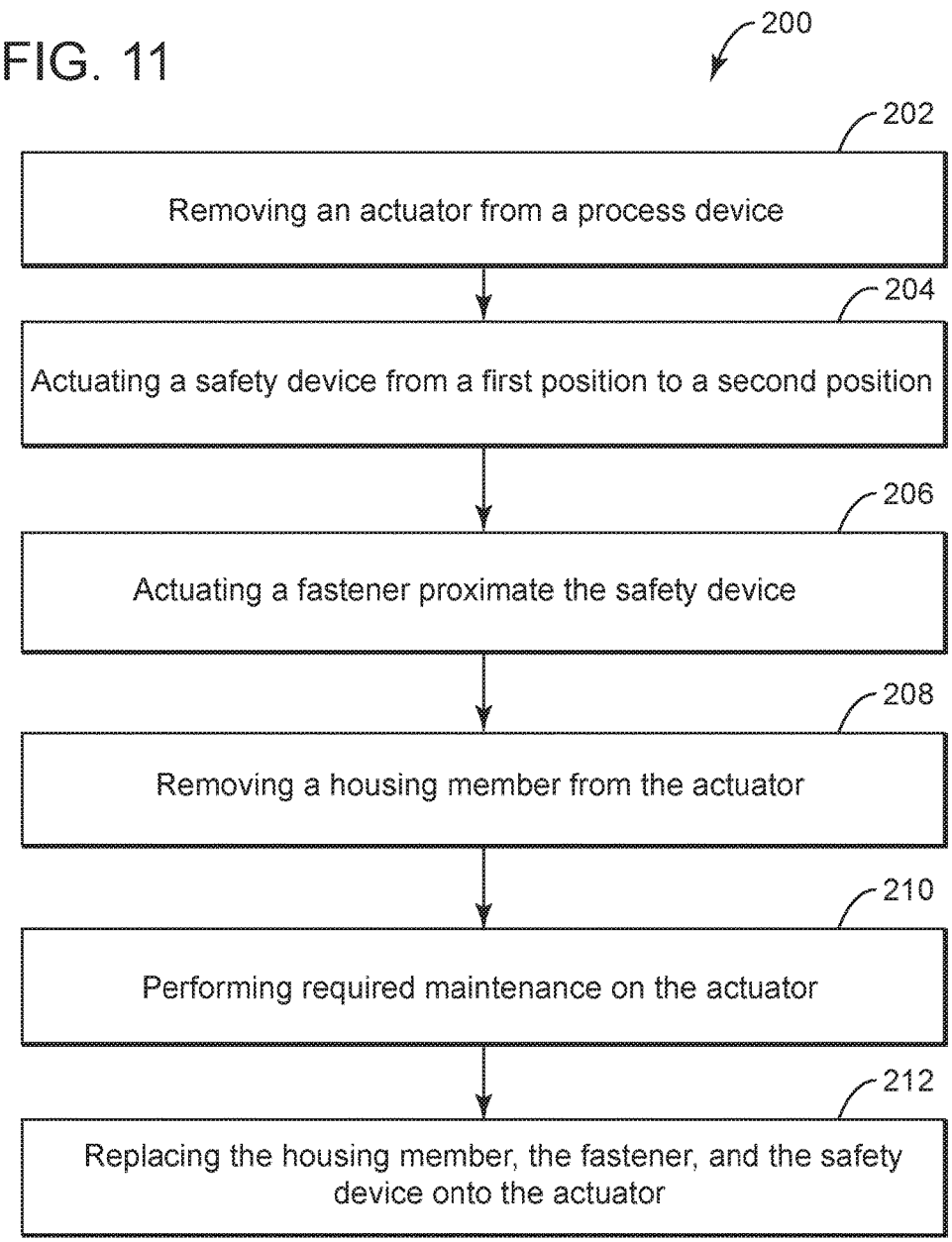
FIG. 11 depicts a flow diagram of an exemplary embodiment of a method to perform service on the actuator of FIGS. 1 and 2.
Figure 12:
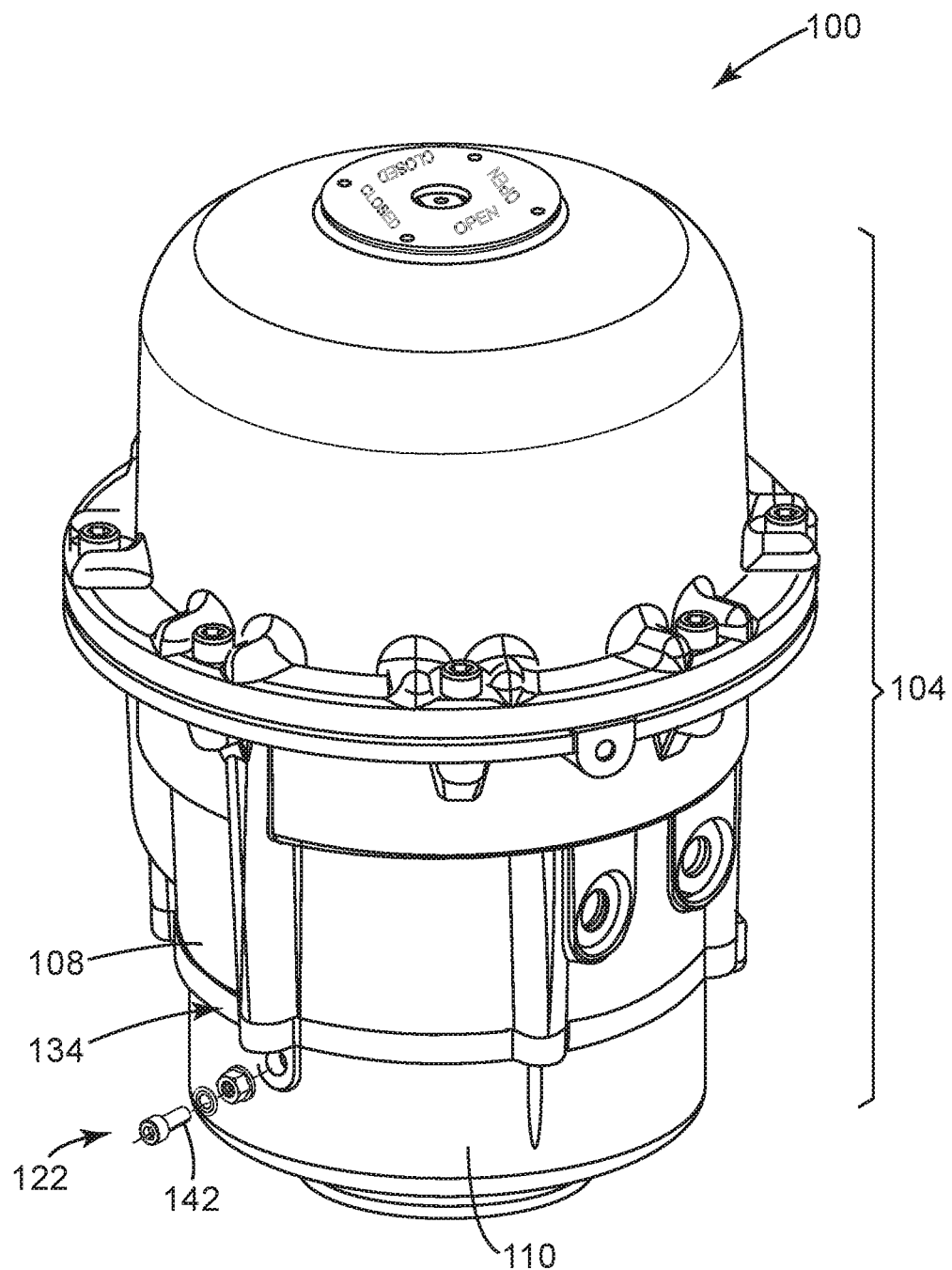
FIG. 12 depicts the actuator of FIG. 2 in partially exploded form.
Figure 13:
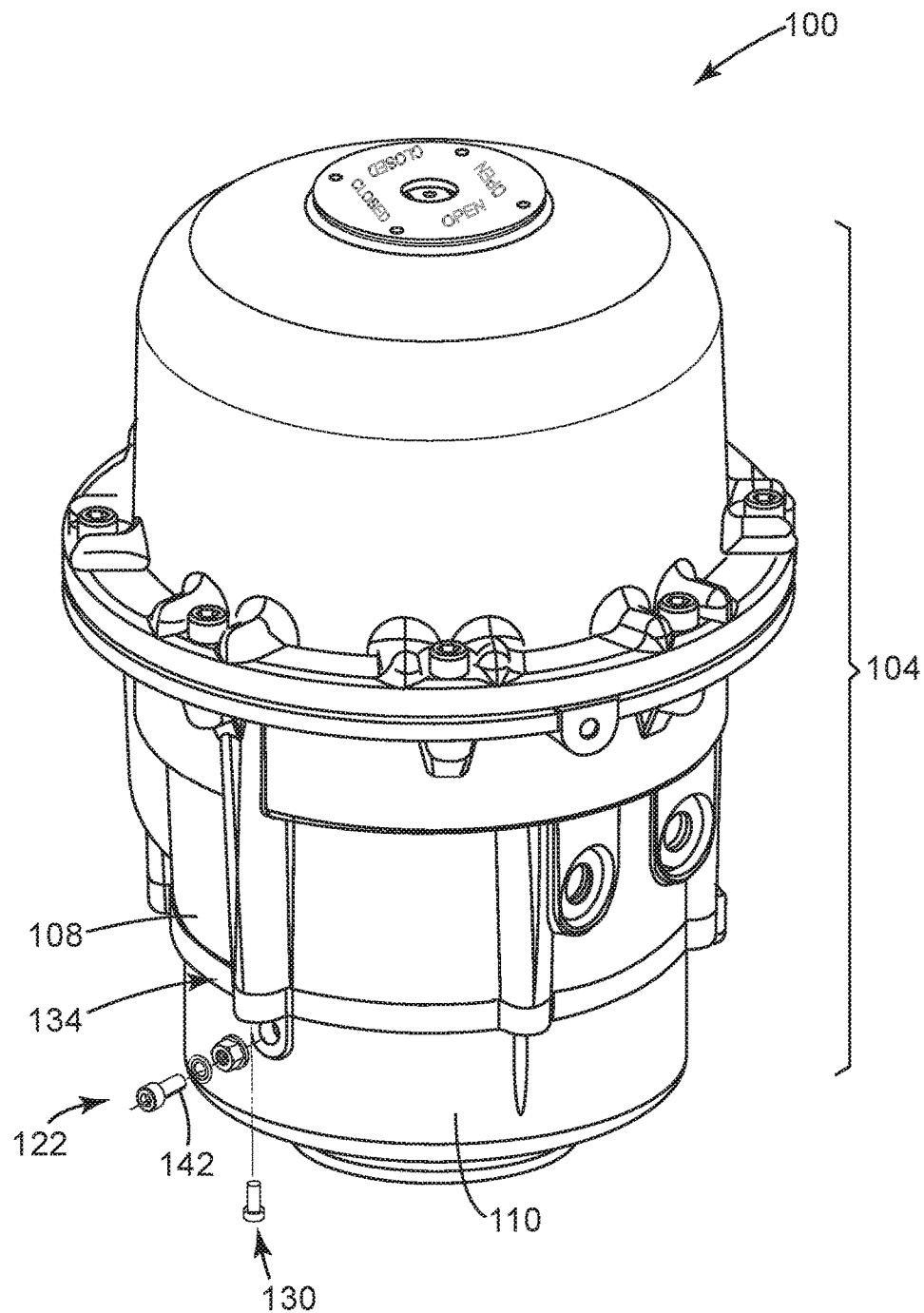
FIG. 13 depicts the actuator of FIG. 2 in partially exploded form.
Figure 14:
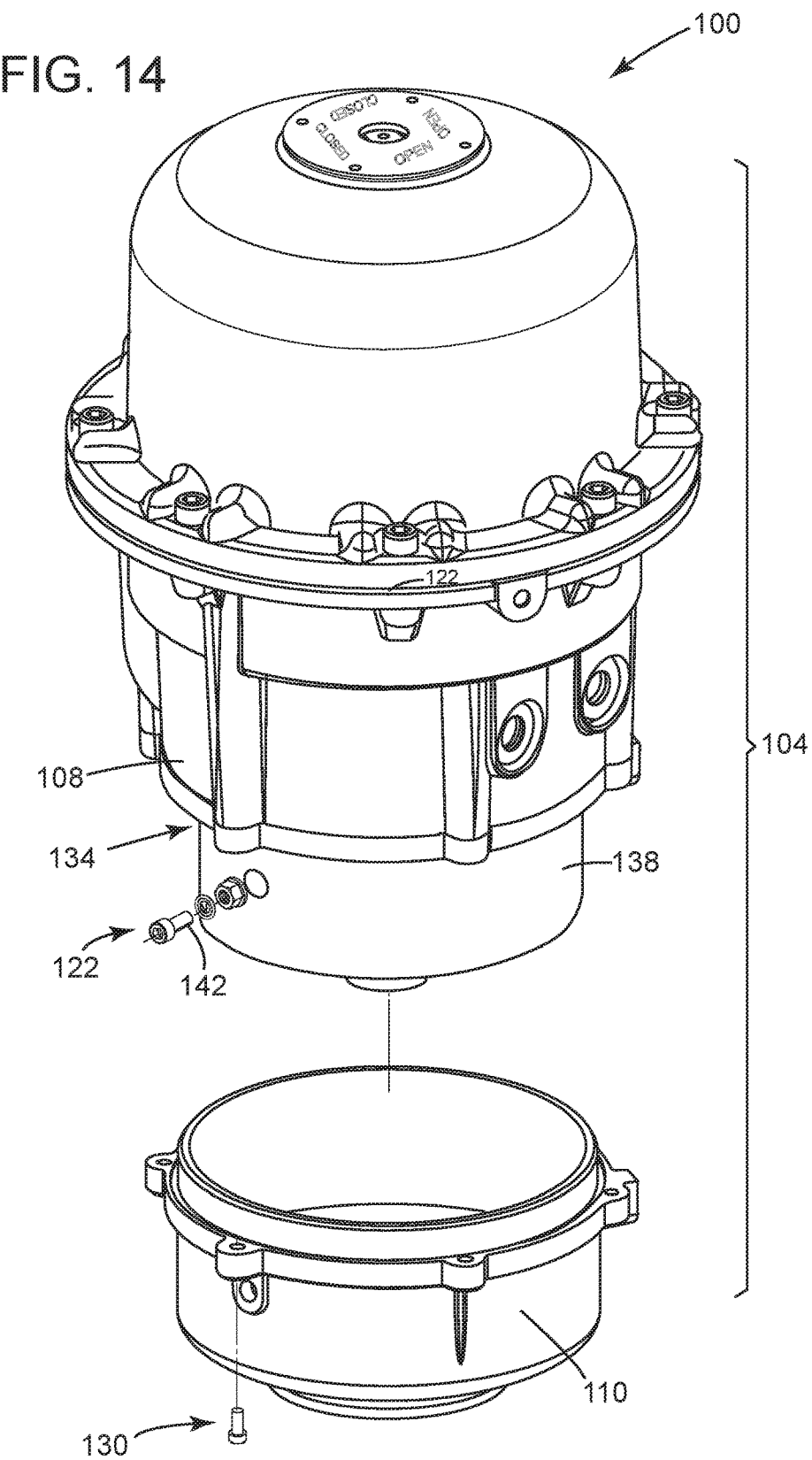
FIG. 14 depicts the actuator of FIG. 2 in partially exploded form.

FIGS. 11, 12, 13, and 14 are useful to discuss an implementation of the safety device 122 to perform service (or maintenance) on the actuator 100. FIG. 11 depicts a flow diagram of a method 200 for servicing an actuator including actuator 100 discussed herein. FIGS. 12, 13, and 14 depict the perspective view of the example of FIG. 4 in partially-exploded form.

The method 200 may include stages that permit the technician to access the interior cavity 114 (FIG. 1). In one implementation, the method 200 may include, at stage 202, removing an actuator from a process device. This stage can free the actuator for further inspection, particularly as relates to the lower part 128 (FIG. 3) of the enclosure that houses the spring 136 (FIG. 3). The method 200 may also include, at stage 204, actuating a safety device from a first position to a second position, at stage 206, actuating a fastener proximate the safety device, and, at stage 208, removing a housing member from the actuator. The method 200 may further include, at stage 210, performing maintenance on the actuator and, at stage 212, replacing the housing member, the fastener, and the safety device onto the actuator.

At stage 204, the method 200 calls for actuating the safety device between positions. This stage may require the technician to use a tool or like implement to engage the fastener 142 in a first position on the actuator 100. The technician may then manipulate the tool to loosen the fastener 142 from the housing 110 and, in turn, cause the fastener 142 to disengage from the nut 146 (FIGS. 8, 9, and 10). The technician can then move the fastener 142 to a second position, shown in FIG. 12 as removed from the housing 110. The second position effectively separates the fastener 142 from its position proximate the boss element 134.

At stage 206, the method 200 calls for actuating the fastener proximate the safety device 122. This stage may also require the technician to use a tool to engage the fastener 130 (not shown) disposed in the boss element 134 proximate the safety device 122. This task is permissible with the fastener 142 does not obstruct the fastener 130 (not shown) in the second position. The technician may then manipulate the tool to loosen the fastener 130 (not shown) from the housings 108, 110. Once loosened, the technician can move the fastener 130 and, in one example, remove the fastener 130 from housing 104 as shown in FIG. 13.

At stage 208, the method 200 calls for removing the housing member from the actuator. This stage is possible with both the fastener 130 and the fastener 142 effectively disengaged from the housing 104. The technician can move the housing member 110 away from the housing 104 as shown in FIG. 14. This action can expose the retaining member 138 so that the technician can access the spring 136 (FIG. 8).

Figure 15:
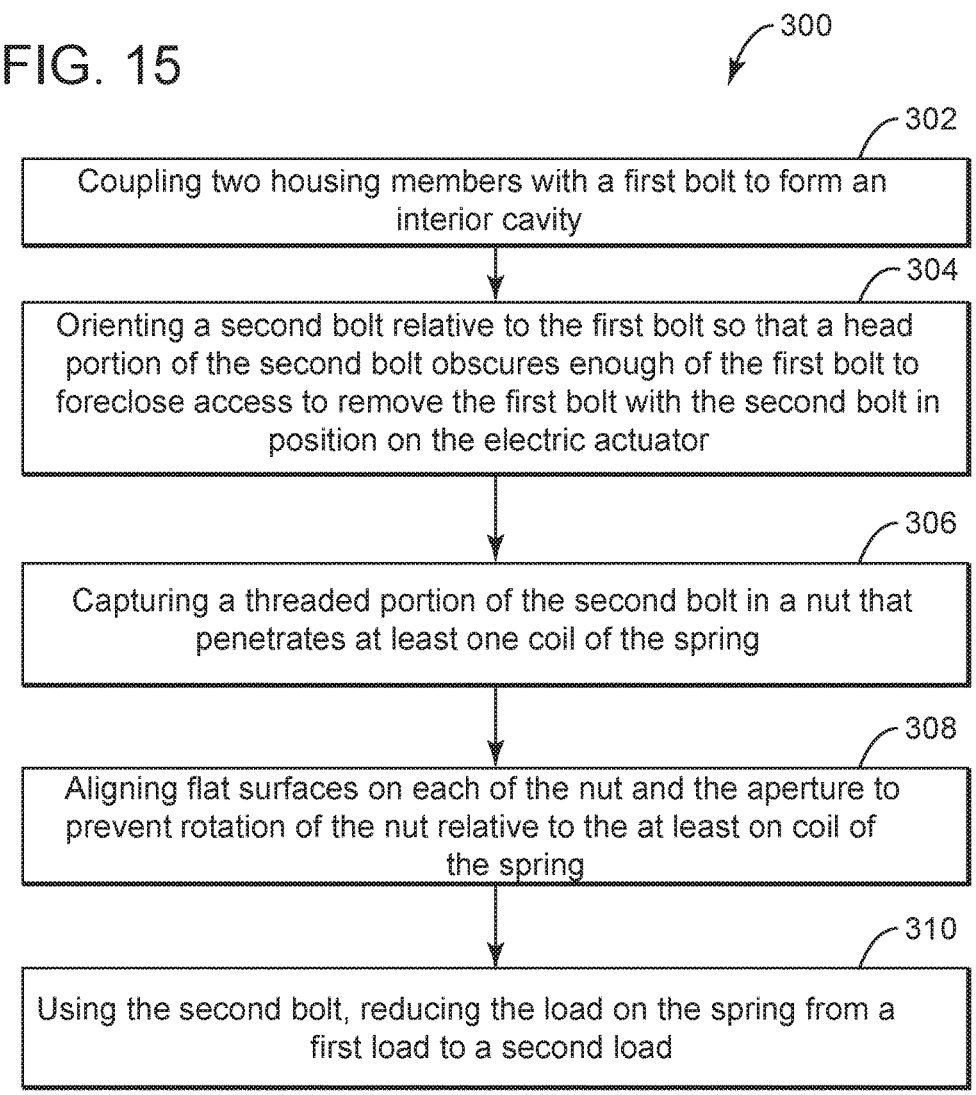
FIG. 15 depicts a flow diagram of an exemplary embodiment of a method for discharging a load on a spring-return mechanism for use on the actuator of FIGS. 1 and 2'

FIG. 15 depicts a flow diagram of an exemplary embodiment of a method 300. The method 300 can include, at stage 302, coupling two housing members on an electric actuator with a first bolt to form an interior cavity. The method 300 can also include, at stage 304, orienting a second bolt relative to the first bolt so that a head portion of the second bolt obscures enough of the first bolt to foreclose access to remove the first bolt with the second bolt in position on the electric actuator. The method 300 may further include, at stage 306, capturing a threaded portion of the second bolt in a nut that penetrates at least one coil of the spring, at stage 308, aligning flat surfaces on each of the nut and the aperture to prevent rotation of the nut relative to the at least one coil of the spring, and, at stage 310, using the second bolt, reducing the load on the spring from a first load to a second load, wherein the tool can access the first bolt at the second load.

Figure 16:
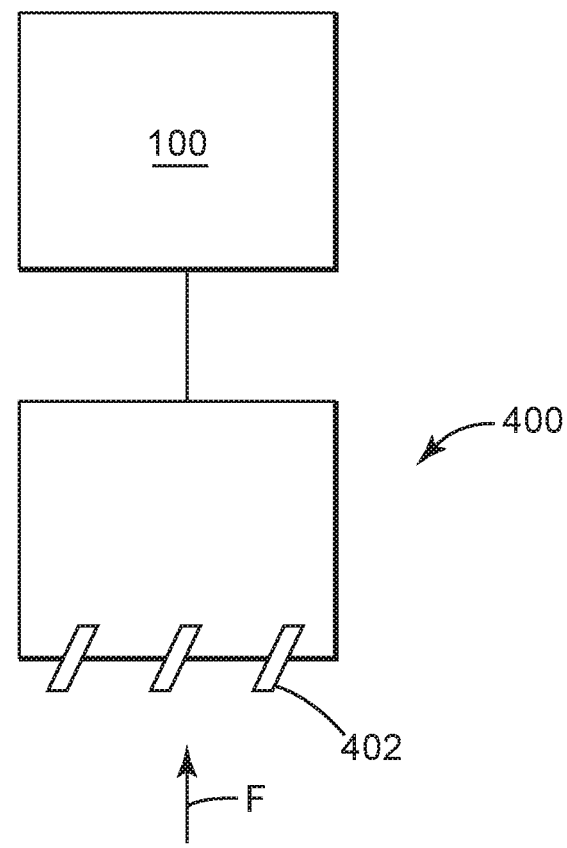
FIG. 16 depicts a schematic diagram of one application of the actuator of FIGS. 1 and 2 with a damper.
Figure 17:
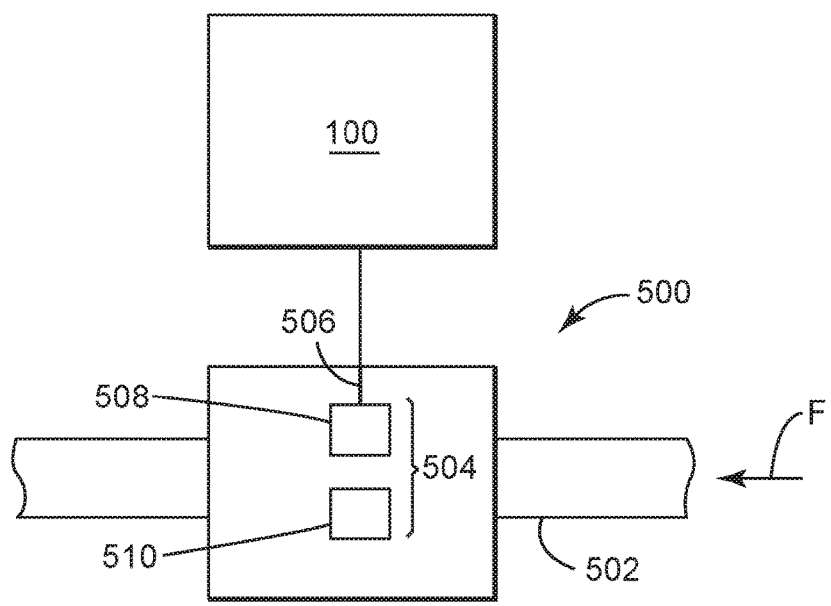
FIG. 17 depicts a schematic diagram of one application of the actuator of FIGS. 1 and 2 with a valve assembly.

FIGS. 16 and 17 illustrate schematic diagrams of the actuator 100 in different applications with examples a damper 400 (FIG. 16) and a valve assembly 500 (FIG. 17) that may benefit from these safety features. In FIG. 16, the damper 400 has louvers 402. The actuator 100 may open and close the louvers 402 to manage flow of fluid F (typically air) as part of heating, ventilation, and air conditioning (HVAC) systems. FIG. 17 shows the valve assembly 500 in communication with a conduit 502. Examples of the conduit 502 may serve as part of a pipeline that carries fluid F (e.g., oil, natural gas, or hydrocarbons, generally,) or as part of piping of a process line that transfers fluid F for use in a process. In this regard, the actuator 100 may couple with a valve 504 having a valve stem 506 interposed therebetween. The valve stem 506 can be configured to cause the actuator 100 to move a closure member 508 relative to a seat 510 on the valve 504. For purposes of the present example, the closure member 508 can embody a plug, typically a solid or piece part device that can engage with the seat 510 to prevent flow of fluid F through the valve 504.

This disclosure considers that devices like the actuator may require service and maintenance to attend to its parts. Over time, parts may experience wear and, possibly, damage that can frustrate operation of the actuator. A technician may need to extract these parts, either in whole or in pieces, to remove existing parts in favor of one or more replacement parts. The replacement parts may originate from an OEM or alternative aftermarket dealer and/or distributor. Examples of the replacement parts may be newly constructed using any of the conventional manufacturing and machining techniques (including additive manufacturing). For certain techniques, a model file that comprises one or more instructions of executable code (on a storage media and/or downloadable and/or executable) may be used to define the features of the replacement part. These instructions may cause a machine (e.g., a lathe, milling machine, 3-D printing machine) to perform certain functions to result in parts for use in the actuator 100.

One or more of the replacement parts for the actuator 100 may be formed by existing parts. For example, the housing members 106, 108, 110 (and others) may lend themselves to refurbishing and like processes to prepare the existing parts into condition and/or to meet specifications for use as the replacement part in the structure. Refurbishing may utilize additive and subtractive manufacturing processes like buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into the actuator 100 as a wholly-constructed assembly. In other implementations, the replacement parts may embody individual parts (e.g., housing members 106, 108, 110), as well as combinations and compilations thereof, possibly in the form of one or more sub-assemblies.

Figure 18:
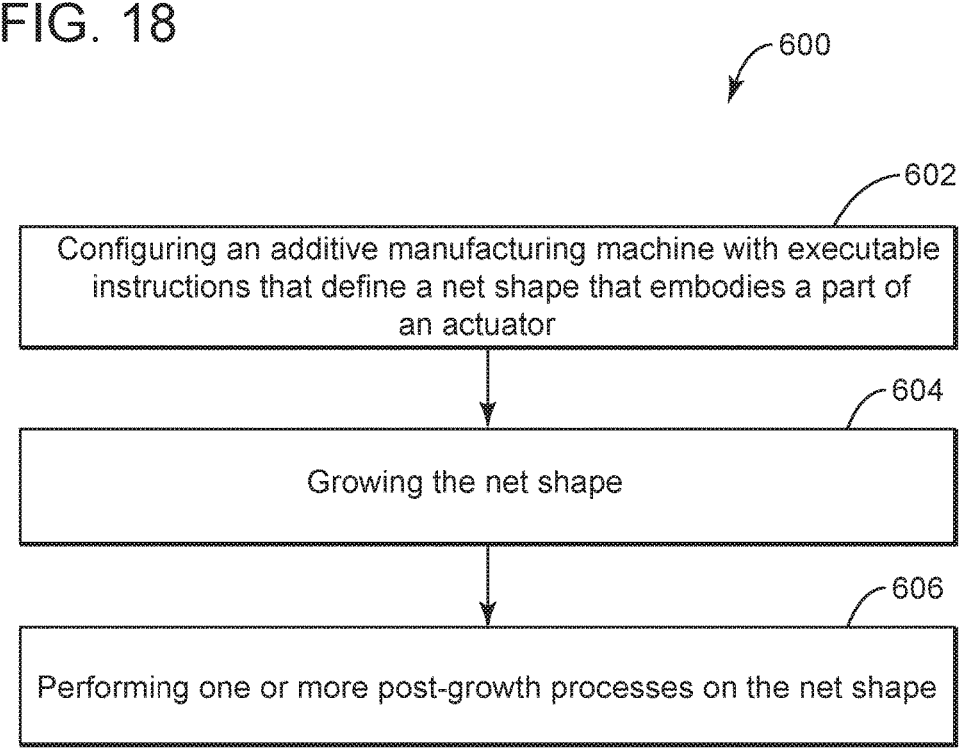
FIG. 18 depicts a flow diagram of an exemplary embodiment of a process to manufacture parts of the actuator of FIGS. 1 and 2.

FIG. 18 illustrates an exemplary process 600 to manufacture an example of the individual parts. The exemplary process may leverage additive manufacturing techniques, alone or in combination with one or more other types of subtractive manufacturing techniques. As shown in FIG. 18, the process 600 can include, at stage 602, configuring an additive manufacturing machine with executable instructions that define a net shape. The net shape can embody the part, in whole or in part, including, for example, configurations of the housings 106, 108, 110 (FIGS. 2, 3, and 4) described hereinabove. The process 600 can also include, at stage 604, growing the net shape and, where necessary, at stage 606, performing one or more post-growth processes on the net shape.

Implementations of the process 600 and related assembly techniques can render embodiments of the actuator 100. These implementations may result in, for example, a bearing comprising a casing made by the process of configuring an additive manufacturing machine with executable instructions that define a net shape, growing the net shape, and performing one or more post-growth processes on the net shape. Such implementation that result in the bearing are also contemplated wherein the one or more post-growth processes comprises one or more of heat treating the net shape, deburring the net shape, machining the net shape, applying a surface finish to one or more surfaces of the net shape, removing material of the net shape using abrasives, and inspecting the net shape to accumulate dimensional data and comparing the dimensional data to a default value.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims In view of the foregoing discussion, the embodiments herein can improve maintenance on actuators that operate process devices. These improvements may find particular use with actuators with spring-return mechanisms, but the safety device discussed herein may have wider application over only this type of actuator. At least one other benefit of the subject matter herein is to configure the actuator to prevent access to the spring-return mechanism under load. This feature may be of benefit to ensure that the actuator is in a safe condition for a technician to perform necessary repair or maintenance tasks.

Implementations of these concepts may also include one or more of the following:

An actuator comprising an output shaft and a spring coupled with the output shaft, the spring comprising coils that circumscribe the output shaft, the coils including an inner coil that secures to the output shaft and an outer coil that is radially outward of the inner coil.

The actuator discussed above and including an aperture in the outer coil.

The actuator discussed above where the aperture has a plurality of flat surfaces.

A safety device comprising a fastener and a nut that couples with the fastener, where the fastener is configured to extend into a housing of an actuator and the nut is configured to engage a coil found in the housing of the actuator.

In this regard, the examples below include certain elements or clauses one or more of which may be combined with other elements and clauses describe embodiments contemplated within the scope and spirit of this disclosure.

What is claimed is:

1. An actuator, comprising:
   a housing comprising a pair of housing members and a fastening device coupling the pair of housing members to one another;
   an output shaft extending longitudinally through the housing, the output shaft having an end configured to couple with a process device;
   a spring coupled with the output shaft; and
   a safety device coupled to the spring and configured to operate to reduce loading of the spring from a first load to a second load,
   wherein the safety device is in position to prevent access to the fastening device at the first load and to allow access to the fastening device at the second load so that the pair of housing members can separate to allow access to the spring in the housing.

2. The actuator of claim 1, wherein the safety device comprises a threaded fastener that penetrates through one of the pair of housing members to engage the spring.

3. The actuator of claim 1, wherein the safety device comprises a nut that couples with the spring.

4. The actuator of claim 1, wherein the spring comprises a coil with a first end and a second end, wherein the first end couples with the output shaft, and wherein the safety device couples with the second end.

5. The actuator of claim 1, wherein the safety device is moveable relative to the housing and the fastening device.

6. The actuator of claim 1, wherein the safety device can be removed from the housing.

7. The actuator of claim 1, wherein the spring has a resilient body with a plurality of coils that wind concentrically from a first end to a second end that is radially outward of the first end, and wherein the safety device engages with the second end of the resilient body.

8. The actuator of claim 7, wherein the second end of the resilient body has an aperture to receive the safety device.

9. The actuator of claim 1, further comprising:
an actuating assembly coupled with the output shaft,
wherein the actuating assembly is configured to actuate the output shaft to operate the process device.

10. The actuator of claim 8, wherein the actuating assembly comprises one of an electric motor or a pneumatic cylinder.

11. An actuator, comprising:
a housing comprising two housing members;
a first bolt coupling the two housing members to one another to form an interior cavity;
an output shaft disposed in the interior cavity and configured to couple with a process device;
a spring coupled with the output shaft, the spring comprising coils that wind around the output shaft; and
a second bolt penetrating one of the two housing members to couple with one of the coils of the spring,
wherein the second bolt is oriented relative to the first bolt to obscure a portion of the first bolt to foreclose access to remove the first bolt with the second bolt in position on the housing.

12. The actuator of claim 11, further comprising:
a nut threaded to engage the second bolt, wherein the nut is disposed in a first coil of the spring that is disposed radially outward of any remaining coils.

13. The actuator of claim 12, wherein the nut has a body with an axis and flat surfaces disposed circumferentially about the axis, and wherein the first coil has an aperture configured to engage the flat surfaces to prevent rotation of the nut relative to the first coils of the spring.

14. The actuator of claim 12, wherein the nut has a shoulder disposed radially inwardly of an inner surface of the first coil.

15. The actuator of claim 12, wherein the second bolt has a head portion that extends away from the housing to reside proximate the first bolt.

16. The actuator of claim 11, wherein the second bolt has a first position and a second position, one each that corresponds with a first load and a second load on the spring, and wherein the tool can access the first bolt at the second load.

* * * * *